United States Patent
LaGasse

(10) Patent No.: US 6,934,476 B2
(45) Date of Patent: Aug. 23, 2005

(54) COSITE INTERFERENCE REJECTION SYSTEM USING AN OPTICAL APPROACH

(75) Inventor: Michael J. LaGasse, Lexington, MA (US)

(73) Assignee: The Boeing Company, Chicago, IL (US)

( * ) Notice: Subject to any disclaimer, the term of this patent is extended or adjusted under 35 U.S.C. 154(b) by 512 days.

(21) Appl. No.: 09/944,974

(22) Filed: Aug. 31, 2001

(65) Prior Publication Data

US 2003/0090769 A1 May 15, 2003

(51) Int. Cl.⁷ .............................................. H04B 10/00
(52) U.S. Cl. ...................... 398/135; 398/137; 398/139; 398/115; 398/140; 398/182; 398/183; 398/188; 398/192; 398/194; 398/195; 398/202; 398/208; 398/209; 455/63; 455/673; 455/82; 455/83; 455/296; 455/303
(58) Field of Search ................................ 398/182, 183, 398/188, 194, 195, 202, 135, 139, 137, 140, 115, 192, 208, 209; 455/63, 673, 82, 83, 296, 303

(56) References Cited

U.S. PATENT DOCUMENTS

| 4,660,042 A | 4/1987 | Ekstrom |
| 5,117,505 A | 5/1992 | Talwar |
| 5,428,831 A | 6/1995 | Monzello et al. |
| 5,548,838 A | 8/1996 | Talwar et al. |
| 5,574,978 A | 11/1996 | Talwar et al. |
| 5,724,169 A | * 3/1998 | LaGasse ..................... 398/141 |
| 6,731,881 B2 | * 5/2004 | Nomura ..................... 398/135 |

* cited by examiner

Primary Examiner—Hanh Phan
(74) Attorney, Agent, or Firm—Harness Dickey & Pierce P.L.C.

(57) ABSTRACT

A cosite interference rejection system allows cancellation of large interfering signals with an optical cancellation subsystem. The rejection system includes an interference subsystem coupled to a transmit system, where the interference subsystem weights a sampled transmit signal based on a feedback signal such that the weighted signal is out of phase with the sampled transmit signal. The optical cancellation subsystem is coupled to the interference subsystem and a receive antenna. The optical cancellation subsystem converts an optical signal into a desired receive signal based on an interfering coupled signal and the weighted signal. The weighted signal is therefore used to drive the optical cancellation subsystem. The rejection system further includes a feedback loop for providing the feedback signal to the interference subsystem based on the desired receive signal.

14 Claims, 2 Drawing Sheets

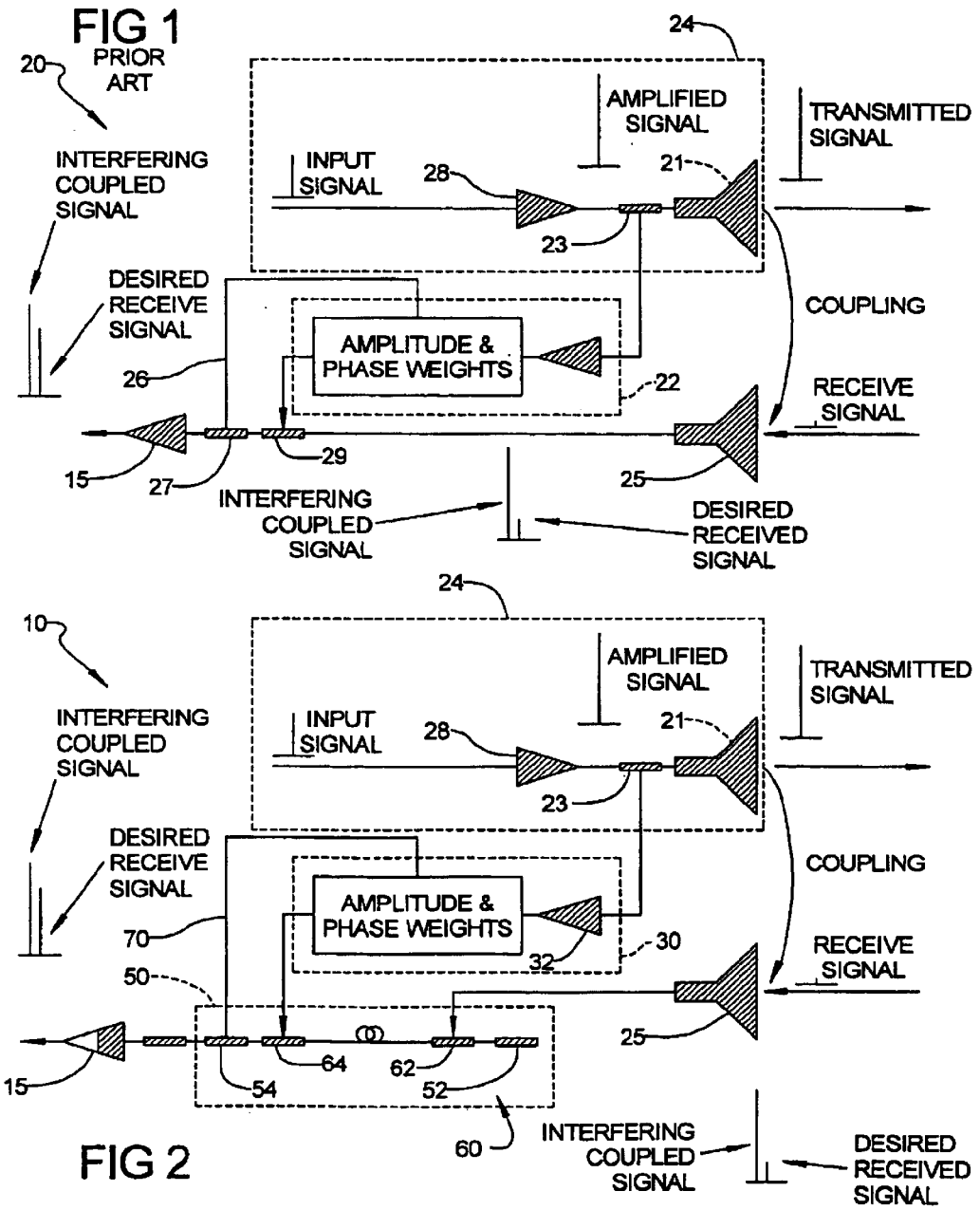

COSITE INTERFERENCE REJECTION SYSTEM USING AN OPTICAL APPROACH

TECHNICAL FIELD

The present invention relates generally to cosite interference rejection systems. More particularly, the invention relates to a cosite interference rejection system having an optical cancellation subsystem.

BACKGROUND OF THE INVENTION

Modern commercial and military aviation applications often require communication systems to transmit high power RF signals in the presence of relatively small RF receive signals. In fact, there is a growing demand in the commercial aircraft industry to increase the number of radios present on a given platform. Similarly, the defense industry is constantly increasing the required number of signals to be simultaneously transmitted and received. Given the limited amount of space available on most platforms, it is therefore easy to understand that high power transmit antennas may interfere with nearby receive antennas. In fact, a typical transmit antenna will radiate hundreds or thousands of watts of power, whereas the power of the desired receive signal will be a fraction of that. If the receive antenna is located in relatively close proximity to the transmit antenna, residual transmitted power will be coupled to the nearby receive antenna. The result is saturation of the low noise amplifier (LNA) associated with the receive antenna. While the common sense approach to this problem is to physically separate the receive antenna from the transmit antenna, on platforms such as aircraft, helicopters, spacecraft, ships, and building tops, such a solution may not be possible due to limited space. Another solution is to use a cosite interference rejection system to cancel the coupled power from the interfering coupled signal obtained by the receive antenna.

A modern day interference rejection system is shown in FIG. 1 at 20. Generally, it can be seen that a transmit system 24 amplifies an input signal with a power amplifier 28 for transmission with a transmit antenna 21. The transmit signal is commonly sampled by a 10 dB coupler 23 for use by an interference subsystem 22. The interference subsystem 22 amplitude and phase weights the sampled transmit signal based on a feedback signal such that the weighted signal is effectively out of phase with the sampled transmit signal. A cancellation coupler 29 couples the weighted signal to an interfering coupled signal obtained from a nearby receive antenna 25. It is important to note that cancellation occurs in the electrical domain. Thus, the cancellation coupler 29 functions as an electrical cancellation subsystem. A feedback loop 26 provides the feedback signal to the interference subsystem 22 based on the desired receive signal produced by the cancellation coupler 29. The feedback loop 26 typically uses a feedback coupler 27 to effectively sample the desired receive signal. The desired receive signal is then passed on to an LNA 15 for amplification.

While the above described conventional interference rejection system 20 partially addresses the issue of cosite interference, there is still room for considerable improvement. For example, the conventional interference rejection system 20 is limited in the amount of coupled power that can be cancelled. In fact, when the coupled power exceeds the threshold of the rejection system 20, the system 20 can no longer transmit and receive simultaneously. The result can be a loss of information. This problem is generally due to the non-linearity of the electrical components used in the system 20. Specifically, the exact reduction in amplitude of the interfering signal depends on how accurately the phase and amplitude of the weighted signal matches the interfering signal. The combination of a high level interfering signal and loss in the couplers 23, 27, 29 makes it difficult for the interference subsystem 22 to maintain linearity. When the linearity degrades, the cancellation performance may be reduced. Eventually, as the interfering levels increase, large signals will reach the input to the LNA 15 causing saturation and additional non-linearities. Under these conditions, it is not possible to receive low-level signals near the system noise floor, and information will be lost. It is therefore desirable to provide a cosite interference rejection system that does not fall subject to the non-linearities associated with high level interfering signals.

Another concern relates to applications where weight distribution is important. For example, it is well known that conventional interference rejection systems can significantly effect the distribution of weight on modern day aircraft. In fact, it is quite difficult to arrange the components of the rejection system to redistribute weight towards the center of gravity in order to improve performance of the aircraft. This is largely due to the electrical nature of the components and connections associated with conventional interference rejection systems. It is therefore desirable to provide a cosite interference rejection system that allows for more efficient weight distribution.

SUMMARY OF THE INVENTION

The above and other objectives are provided by a cosite interference rejection system in accordance with the present invention having an optical cancellation subsystem. Specifically, the rejection system includes an interference subsystem coupled to a transmit system, where the interference subsystem weights a sampled transmit signal based on a feedback signal such that the weighted signal is out of phase with the sampled transmit signal. The optical cancellation subsystem is coupled to the interference subsystem and a receive antenna. The optical cancellation subsystem converts an optical signal into a desired receive signal based on an interfering coupled signal and the weighted signal. The rejection system further includes a feedback loop for providing the feedback signal to the interference subsystem based on the desired receive signal. Using the optical cancellation subsystem to convert an optical signal into the desired receive signal allows the above problems associated with non-linearity to be eliminated.

Further, in accordance with the present invention, an optical cancellation subsystem is provided. The preferred optical cancellation subsystem has an optical source for generating an optical signal, a modulation network coupled to the optical source, a receive antenna and an interference subsystem. The modulation network phase modulates the optical signal based on an interfering coupled signal from the receive antenna and a weighted signal from the interference subsystem. A demodulation system is coupled to the modulation network, where the demodulation system demodulates the phase modulated optical signal to generate a desired receive signal.

The present invention also provides a method for rejecting cosite interference. The method includes the step of weighting a sampled transmit signal based on a feedback signal such that the weighted signal is out of phase with the sampled transmit signal. An optical signal is converted into a desired receive signal based on an interfering coupled signal and the weighted signal. The method further provides for generating the feedback signal based on the desired receive signal.

BRIEF DESCRIPTION OF THE DRAWINGS

The various advantages of the present invention will become apparent to one skilled in the art by reading the following specification and subjoined claims and by referencing the following drawings, in which:

FIG. 1 is a block diagram of a conventional cosite interference rejection system useful in understanding the present invention;

FIG. 2 is a block diagram of a cosite interference rejection system in accordance with a preferred embodiment of the present invention;

DETAILED DESCRIPTION OF THE PREFERRED EMBODIMENTS

Figure 4:
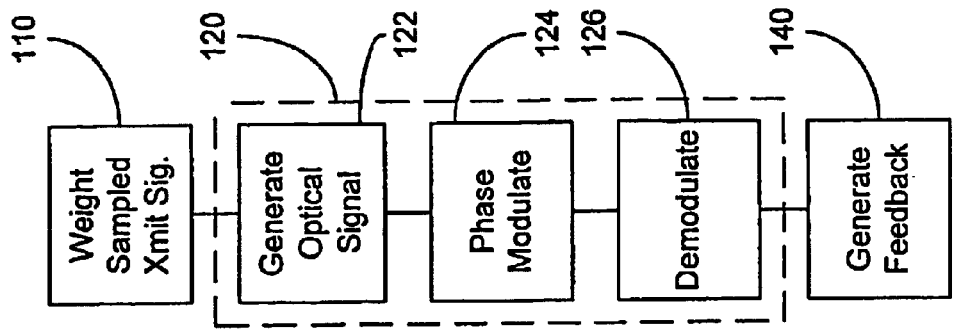
FIG. 4 is a flowchart of a process for converting an optical signal into a desired receive signal in accordance with the principles of the present invention.

Turning now to FIG. 2, the preferred cosite interference rejection system is shown at 10. Generally, the rejection system 10 has an interference subsystem 30, an adaptive optical cancellation subsystem 50, and a feedback loop 70. It can be seen that the interference subsystem 30 is coupled to a transmit system 24. The interference subsystem 30 amplitude and phase weights a sampled transmit signal based on a feedback signal such that the weighted signal is out of phase with the sampled transmit signal. The weighted signal is therefore also out of phase with the actual transmitted signal. It can also be seen that the interference subsystem 30 has an amplifier 32 for amplifying the sampled transmit signal, in addition to an amplitude and phase module 34 for weighting the sampled transmit signal.

The optical cancellation subsystem 50 is coupled to the interference subsystem 30 and a receive antenna 25. The receive antenna 25 is located in close enough proximity to the transmit antenna 21 for power transmitted by the transmit system 24 to be coupled to the receive antenna 25. The result is an interfering coupled signal made up of both the transmitted signal and the desired receive signal. It can be seen that the optical cancellation subsystem 50 converts an optical signal into the desired receive signal based on the interfering coupled signal and the weighted signal.

The feedback loop 70 provides the feedback signal to the interference subsystem 30 based on the desired receive signal. The rejection system 10 may further include an LNA 15 if amplification is necessary. In fact, the optical cancellation subsystem 50 is effectively able to set the system noise figure, and therefore behaves like a very high-dynamic range, low-noise amplifier. It is important to note that under the conventional electronic approach, the LNA is required and the large interfering signal must be removed before the LNA. If this is not done, non-linearities will degrade the system noise figure.

In one preferred embodiment, the optical cancellation subsystem 50 includes an optical source 52, a modulation network 60, and a demodulation system 54. It will be appreciated that the optical source 52 can be a laser or any other device capable of generating a modulatable optical signal. The modulation network 60 is coupled to the optical source 52, the receive antenna 25, the interference subsystem 30, and the demodulation system 54. The modulation network 60 phase modulates the optical signal based on the interfering coupled signal and the weighted signal. The demodulation system 54 is coupled to the modulation network 60 and the feedback loop 70, where the demodulation system 54 demodulates the phase modulated optical signal to obtain the desired receive signal.

It is highly preferred that the modulation network 60 includes a first modulator 62 coupled to the optical source 52 and the receive antenna 25. The first modulator 62 phase modulates the optical signal based on the interfering coupled signal. The modulation network 60 further includes a second modulator coupled to the interference subsystem 30, where the second modulator 64 phase modulates the optical signal based on the weighted signal. The weighted signal therefore functions as a drive signal to the second modulator 64. It is important to note that this approach is quite different to that of conventional approaches wherein the weighted signal is merely coupled to the interfering coupled signal in the electrical domain. A fiber optic subsystem 66 transfers the optical signal from the first modulator 62 to the second modulator 64.

It is important to note that the use of low-loss fiber optics allows the different subsystems to be more efficiently located. For example, the first modulator 62 can be located at the receive antenna 25, where it can immediately set the system noise figure. The second modulator 64 and the components associated with the feedback loop 70 can be located in a central, conveniently accessible electronics bay. Hence, in an aircraft application, redistributing weight toward the center of gravity can improve the performance of the aircraft. This concept can be extended using techniques well known in the art to allow several systems to share cancellation hardware through a fiber switched network. This type of architecture reduces weight and cost, and increases performance.

Figure 3:
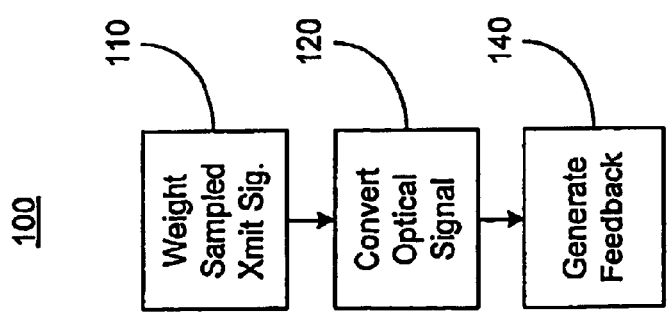
FIG. 3 is a flowchart of a method for rejecting cosite interference in accordance with the principles of the present invention.

Thus, FIG. 3 shows a method 100 for rejecting cosite interference in accordance with the present invention for programming purposes. It will be appreciated that method 100 can be readily implemented with a combination of hardware and software using techniques well known in the art. It therefore can be seen that at step 110 a sampled transmit signal is weighted based on a feedback signal such that the weighted signal is out of phase with the sampled transmit signal. At step 120, an optical signal is converted into a desired receive signal based on an interfering coupled signal and the weighted signal. The method further provides for generating the feedback signal at step 140 based on the desired receive signal.

The preferred approach to converting the optical signal at step 120 is shown in FIG. 4. Specifically, it can be seen that at step 122 the optical signal is generated, and at step 124 the optical signal is phase modulated based on the interfering coupled signal and the weighted signal. As already discussed, phase modulation preferably occurs via a first phase modulator based on the interfering coupled signal, and a second phase modulator based on the weighted signal. The optical signal can be transferred to the second phase modulator with a fiber optic subsystem as already discussed. The process at step 120 further includes the step 126 of demodulating the phase modulated optical signal.

Returning now to FIG. 2, it will be appreciated that multiplexing the large interfering signal with the second modulator 64 eliminates the RF loss associated with the cancellation coupler used in the conventional approach. This is significant because the amplifier driving the second modulator 64 has lower power and is more linear than all-electric cancellation subsystems. This increase in linearity gives a better cancellation ratio over a higher range of coupled power. Furthermore, high dynamic range optical links having a laser, optical phase modulator, and optical phase demodulator are commercially available. In fact, mathematical models are able to predict the performance of the link with high accuracy. The result is negligible non-linearities in the phase modulation process. Publications by the Navy Research Laboratory, and MIT Lincoln Laboratory have demonstrated noise figures below 3 dB, and modulators that have sufficient sensitivity to operate at frequencies below 1 GHz. Other evidence can be found in the laser gyroscope field, which has measured data showing residual amplitude modulation that is over 60 dB less than conventional phase modulation approaches. The present invention is therefore able to address the need for an increased number of radios as well as the need for an increased number of signals with respect to modern day aviation platforms.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A cosite interference rejection system comprising:
   an interference subsystem coupled to a transmit system, the interference subsystem weighting a sampled transmit signal based on a feedback signal such that the weighted signal is out of phase with the sampled transmit signal;
   an optical cancellation subsystem coupled to the interference subsystem and a receive antenna, the optical cancellation subsystem converting an optical signal into a desired receive signal based on an interfering coupled signal and the weighted signal; and
   a feedback loop for providing the feedback signal to the interference subsystem based on the desired receive signal;
   wherein the optical cancellation subsystem includes:
      an optical source for generating the optical signal;
      a modulation network coupled to the optical source, the receive antenna, and the interference subsystem, the modulation network phase modulating the optical signal based on the interfering coupled signal and the weighted signal; and
      a demodulation system coupled to the modulation network and the feedback loop, the demodulation system demodulating the phase modulated optical signal;
   wherein the modulation network includes:
      a first modulator coupled to the optical source and the receive antenna, the first modulator phase modulating the optical signal based on the interfering coupled signal;
      a second modulator coupled to the interference subsystem, the second modulator phase modulating the optical signal based on the weighted signal; and
      a fiber optic subsystem for transferring the optical signal from the first modulator to the second modulator.

2. The rejection system of claim 1 wherein the first modulator is remotely located from the second modulator.

3. The rejection system of claim 2 wherein the rejection system is fixed to an aircraft, the first modulator and the second modulator being positioned to obtain a desired weight distribution within the aircraft.

4. The rejection system of claim 1 wherein the optical source comprises a laser.

5. The rejection system of claim 1 wherein power transmitted by the transmit system is coupled to the receive antenna.

6. The rejection system of claim 1 wherein the interference subsystem includes:
   an amplifier for amplifying the sampled transmit signal; and
   an amplitude and phase module for weighting the sampled transmit signal.

7. The rejection system of claim 1 wherein the feedback loop includes a coupler for sampling the desired receive signal.

8. The rejection system of claim 1 further including a low noise amplifier for amplifying the desired receive signal.

9. An optical cancellation subsystem for a cosite interference rejection system, the optical cancellation subsystem comprising:
   an optical source for generating an optical signal;
   a modulation network coupled to the optical source, a receive antenna, and an interference subsystem, the modulation network phase modulating the optical signal based on an interfering coupled signal from the receive antenna and a weighted signal from the interference subsystem; and
   a demodulation system coupled to the modulation network, the demodulation system demodulating the phase modulated optical signal to generate a desired receive signal;
   wherein the modulation network includes:
      a first modulator coupled to the optical source and the receive antenna, the first modulator phase modulating the optical signal based on the interfering coupled signal;
      a second modulator coupled to the interference subsystem, the second modulator phase modulating the optical signal based on the weighted signal; and
      a fiber optic subsystem for transferring the optical signal from the first modulator to the second modulator.

10. The cancellation subsystem of claim 9 wherein the first modulator is remotely located from the second modulator.

11. The cancellation subsystem of claim 10 wherein the cancellation subsystem is fixed to an aircraft, the first modulator and the second modulator being positioned to obtain a desired weight distribution within the aircraft.

12. The cancellation subsystem of claim 8 wherein the optical source comprises a laser.

13. A method for rejecting cosite interference, the method comprising the steps of:
   weighting a sampled transmit signal based on a feedback signal such that the weighted signal is out of phase with the sampled transmit signal;
   converting an optical signal into a desired receive signal based on an interfering coupled signal and the weighted signal;
   generating the feedback signal based on the desired receive signal;
   generating the optical signal;
   phase modulating the optical signal based on the interfering coupled signal and the weighted signal;
   demodulating the phase modulated optical signal;
   phase modulating the optical signal with a first phase modulator based on the interfering coupled signal;

transferring the optical signal to a second phase modulator with a fiber optic subsystem; and phase modulating the optical signal with the second phase modulator based on the weighted signal.

14. The method of claim 13 further including the step of generating the optical signal with a single wavelength laser.

* * * * *